United States Patent
Hörentrup et al.

(10) Patent No.: US 7,643,384 B2
(45) Date of Patent: Jan. 5, 2010

(54) METHOD FOR CONTROLLING AN OPTICAL PICK-UP FOR READING DATA STREAMS FOR SIMULTANEOUS REPRODUCTION

(75) Inventors: Jobst Hörentrup, Hannover (DE); Dirk Gandolph, Ronnenberg (DE); Harald Schiller, Hannover (DE); Ralf Ostermann, Hannover (DE); Hartmut Peters, Barsinghausen (DE)

(73) Assignee: Thomson Licensing, Boulogne Billancourt (FR)

( * ) Notice: Subject to any disclaimer, the term of this patent is extended or adjusted under 35 U.S.C. 154(b) by 523 days.

(21) Appl. No.: 10/552,264

(22) PCT Filed: Mar. 22, 2004

(86) PCT No.: PCT/EP2004/002996

§ 371 (c)(1),
(2), (4) Date: Jul. 28, 2006

(87) PCT Pub. No.: WO2004/088657

PCT Pub. Date: Oct. 14, 2004

(65) Prior Publication Data

US 2006/0262679 A1 Nov. 23, 2006

(30) Foreign Application Priority Data

Apr. 2, 2003 (EP) .................................. 03007610

(51) Int. Cl.
G11B 7/085 (2006.01)

(52) U.S. Cl. .................................. 369/30.23; 369/47.1

(58) Field of Classification Search ........................ None
See application file for complete search history.

(56) References Cited

U.S. PATENT DOCUMENTS 5,543,861 A 8/1996 Harradine et al.

(Continued)

FOREIGN PATENT DOCUMENTS

EP 0944269 9/1999

(Continued)

OTHER PUBLICATIONS

Patent Abstracts of Japan, vol. 1999, No. 10, Aug. 31, 1999 & JP 11 144378, May 28, 1999.

Primary Examiner—Joseph H Feild
Assistant Examiner—Henok G Heyi
(74) Attorney, Agent, or Firm—Robert D. Shedd; Robert B. Levy; Jorge Tony Villabon

(57) ABSTRACT

Optical discs may support "Out Of Multiplex" formats, meaning that different presentation components, like video, audio and subtitles, are stored on different files on the disc, e.g. Blu-ray discs. The different data streams are read by a single pick-up, requiring frequent pick-up jumps and extensive data buffering. The method for operating a scheduler for an optical pick-up reduces the number of pick-up jumps while optimizing the required buffer space. The scheduler is based on a static schema, meaning that the buffer for the data stream with the highest data rate is of minimal size, and therefore refilled in short periods, while the buffers for the lower rated streams are dimensioned such that they can be refilled in multiples of the short period. Deviations from the static schema may be allowed, e.g. due to multi-angle video technique. Afterwards the scheduler returns to the original schedule.

14 Claims, 3 Drawing Sheets

U.S. PATENT DOCUMENTS

| | | |
|---|---|---|
| 6,295,409 B1 | 9/2001 | Ikeda |
| 6,463,208 B1 * | 10/2002 | Kim .......................... 386/124 |
| 6,463,209 B2 * | 10/2002 | Schultz et al. ............. 386/125 |
| RE37,994 E | 2/2003 | Fukuda et al. |
| 2003/0190153 A1 | 10/2003 | Itoh et al. |
| 2005/0013583 A1 * | 1/2005 | Itoh .............................. 386/1 |
| 2007/0274681 A1 * | 11/2007 | Andolph et al. ............... 386/95 |

FOREIGN PATENT DOCUMENTS

| | | |
|---|---|---|
| EP | 1011268 | 6/2000 |
| EP | 1328118 | 7/2003 |
| JP | 11-144378 | 5/1999 |
| WO | WO 0223896 A | 3/2002 |

\* cited by examiner

METHOD FOR CONTROLLING AN OPTICAL PICK-UP FOR READING DATA STREAMS FOR SIMULTANEOUS REPRODUCTION

FIELD OF THE INVENTION

This invention relates to a method for operating a scheduler for an optical pick-up. The pick-up reads data streams from an optical storage medium, wherein the data streams belong to different data types like audio, video or subtitles, and are distributed to several files on the storage medium.

BACKGROUND

Pre-recorded or self-recorded optical discs may support "Out Of Multiplex" (OOM) formats. Out of multiplex is a format that stores different presentation components, e.g. video, audio and subtitles, on different locations on the disc, i.e. different files. This may be possible with various standardized media, e.g. Blu-ray disc. Also, a video technique known as multi-angle, or seamless angle change, may be implemented. It is well known from DVD-Video, and it means that a video film may contain multiple video tracks that are parallel on the time-line, wherein each video track usually shows the same scene from a different perspective. The user may select a perspective, e.g. by pressing a dedicated button. It is a requirement that switching between the different video tracks is performed with minimal delay, and that the tracks are integrated seamlessly into the video.

During playback of OOM formats, a number of the presentation components need to be decoded separately, and then presented synchronously and continuously, i.e. without noticeable interruption of the presentation. Therefore it is required that each of the decoders is provided with a continuous stream of data. On the other hand, optical drives are usually equipped only with a single pick-up unit, which is capable of reading only one data stream from the disc at a time, at a higher data rate than required by any of the decoders. That means that the pick-up has to jump from stream to stream in order to serve all decoders simultaneously. This requires buffering, i.e. the data that are read from the disc are fed into properly sized buffers, wherein each of the buffers is associated with a decoder. Buffering the coded data is more effective than buffering the decoded data. Thus, any decoder is provided with a continuous data stream.

Feeding the buffers requires a scheduling algorithm, because any buffer under-run must be prevented for a continuous presentation. The buffer sizes strongly depend on the applied scheduling scheme.

A pick-up usually contains an actuator carrying an optical sensor, and the pick-up is movable by a mechanical drive for raw adjustment, while the actuator is separately movable for fine adjustment without a mechanical drive. When the pick-up has to read multiple streams, this requires a much higher pick-up jump frequency than a single, multiplexed stream.

SUMMARY OF THE INVENTION

One problem arising from the fact that multiple files must be read simultaneously is the high pick-up jump frequency causing noise and wastage due to the mechanical drive. A further problem is the delay appearing during seamless video angle switches. The delay is the time needed from requesting the video angle change until seeing the other video angle. It is determined mainly by the video buffer size, or by the amount of time until the video buffer has run empty and the new content reaches the video decoder. The same applies to the start up of OOM decoding. The time passing by from pressing the start button until effectively starting the display is quite long, since all buffers must be filled from scratch.

A problem to be solved by the invention is to provide a scheduling method for controlling a pick-up such that a reduction of the pick-up jump frequency is achieved, while using a minimum of buffering space. This problem is solved by the method disclosed in claim 1.

Advantageously, a method for reducing the delay times required for angle switch can be included. This method is disclosed in claim 6.

Another problem to be solved by the invention is to reduce the delay times required at presentation start up. This problem is solved by the method disclosed in claim 8.

The inventive method leads to a lower pick-up jump frequency and thus achieves noise reduction and improved pick-up durability. According to the invention, this is achieved by employing an appropriately adapted scheduling raster, and by individually increasing the lower-rated buffers by a small amount of memory. The proposed scheduling raster is static, i.e. based on a fixed time constant, and thus independent from the actual buffer filling. Further, the method provides a technique for OOM decoding that reduces the switching time for seamless angle changes. For a HDTV stream, the typical application of Blu-ray disc, the buffers are quite large. The large buffers cause a long delay for the user waiting for a requested angle change to get visible, which delay can be reduced by the inventive method. The same problem arises for the start-up of OOM decoding. According to the invention, the problem of optimizing the start-up or video switch procedure for the proposed scheduling scheme can be solved by filling the buffers only partially, such that the buffer filling situation matches with an optimal position in the static scheduling scheme.

According to the invention, it is possible to interrupt the scheme by an angle change request, and return to the scheme after serving the request, when the normal scheme is such that for any three successively read data streams, wherein the second is the video data stream, the first or the third data stream is also the video data stream.

Advantageously, the invention can also be used to optimize the partitioning of a given amount of buffering space for the described application.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 an exemplary buffer filling diagram for a static scheduler.

DETAILED DESCRIPTION OF THE INVENTION

In the following, a detailed description of the invention including a detailed analysis of the problem is given. Though the invention is suitable for any number of data streams, the typical application case of three streams is described here, namely video, audio and subtitle streams.

OOM decoding is mainly influenced by the following mutually dependent parameters:

the maximum data rate of the pick-up $R_D$,
the maximum pick-up jump time $T_j$,
the pick-up jump frequency $f_{jump}$,
the maximum data rate of the first component stream $R_V$,
the size of the corresponding buffer $B_V$,
the maximum data rate of the second component stream $R_A$,
the size of the corresponding buffer $B_A$,
the maximum data rate of the third component stream $R_S$,
and the size of the corresponding buffer $B_S$.

The pick-up jump time is the maximum time required by the mechanical move of the pick-up to a new position, ending when data from the new stream reach the buffer. This time may depend on the data allocation on the medium. The order of the component streams is the order of their data rates, i.e. the first component stream has the highest data rate $R_V$, the second stream the second highest data rate $R_A$ etc. Therefore, in the typical application mentioned above $R_V$ refers to the video stream, $R_A$ to the audio stream and $R_S$ to the subtitle stream. The buffer sizes $B_V, B_A, B_S$ do not encompass any decoder internal buffers, and thus are independent from e.g. any special decoder.

Figure 1:
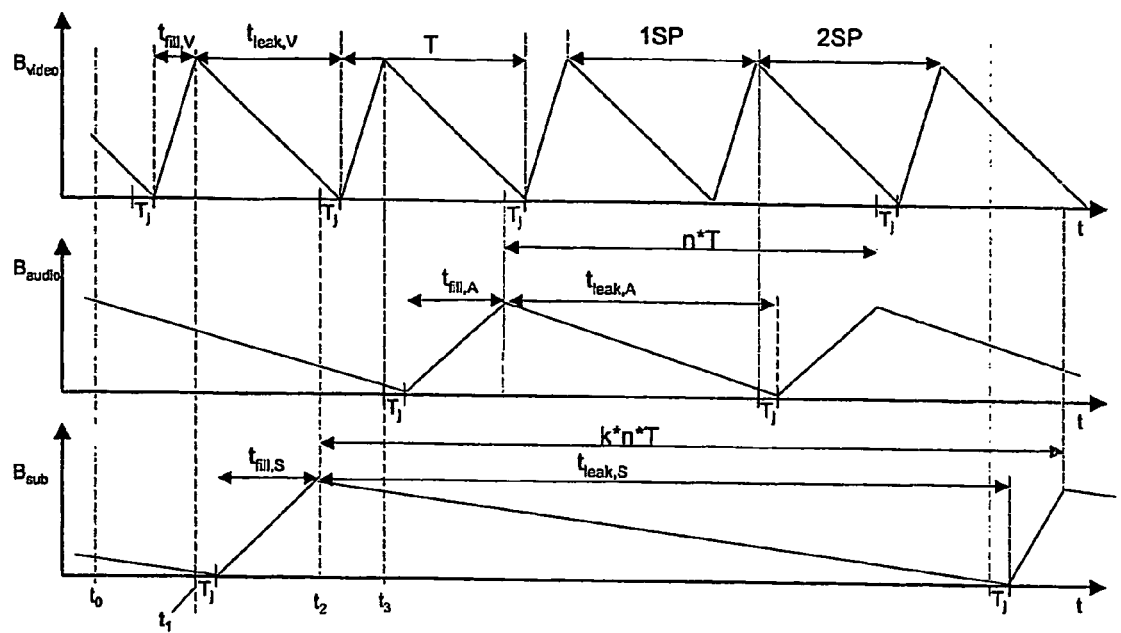

Further, a basic system time constant T and integer numbers n and k are introduced. According to the invention, the system time constant T is selected such that the buffer of the component with the highest data-rate, e.g. video, is being continuously emptied and refilled in periods of T, while all lower rated component buffers are emptied and refilled in periods of multiples of T. FIG. 1 shows buffer fillings of an exemplary system according to the invention during a complete pick-up cycle, assuming a situation where all buffers already contain data and are continuously being read, and assuming that when a buffer is being filled it is being filled completely. Consequently, the pick-up data rate $R_D$ must be considerably higher than any of the read data rates $R_V, R_A, R_S$, which is a realistic case.

In FIG. 1, at a certain time t0 the pick-up is idle since all buffers contain data. The pick-up position, depending on its previous action not shown, may be on the video stream. If the position is another, the pick-up jumps to the video stream within a time of not more than $T_j$. Then it reads video data and fills the video buffer $B_{video}$ within a time of $t_{fill,v}$. When the video buffer is full at a time $t_1$, it requires no further refill within a time period of $t_{leak,v}$. During this time the pick-up jumps to the subtitle stream, requiring a jump time of $T_j$, and fills the subtitle buffer $B_{sub}$ within a time of $t_{fill,S}$. Then at the time $t_2$ it jumps back to the video stream within $T_j$. In the inventive system the buffer sizes are selected such that at the time $t_2+T_j$, when the video data reach the video buffer $B_{video}$, the buffer still has enough data to continuously provide the decoder with data. The video buffer is refilled, and then at a time $t_3$ the pick-up jumps to the audio stream, since the audio buffers requires refilling after another $T_j$. After filling the audio buffer during $t_{fill,A}$ the pick-up returns to the video stream. The described schema is continued such that the pick-up reads the highest rated stream and any of the lower rated streams in turn, meaning that when it has read any one lower rated stream to fill a corresponding buffer $B_{audio}, B_{sub}$, it always returns to the highest rated stream, and reads that stream at least once to fill the corresponding buffer $B_{video}$. In other words, at least one out of two successively read data streams is the stream with the highest data rate. In this respect, the schema is static.

Advantageously this schema can also handle components with variable data-rate, up to a maximum allowed data rate. Variable data-rate of a component simply causes a higher remaining buffer filling level than calculated, at the time the buffer is refilled, and therefore results in quicker filling. However, according to the invention this shall not influence the scheduling raster. Instead, it results in some additional pick-up idle time.

An important aspect of the invention is that each of the lower rated component buffers, i.e. audio and subtitles, is being refilled and emptied at its own time-constant, wherein the time-constant for the audio component is n*T, and the time-constant for the subtitle component is k*n*T. As defined above, T is the time required for a complete cycle of filling and emptying the buffer for the highest rated stream, and n and k are integer numbers. Therefore the inventive scheduler is static also with respect to accessing the lower rated streams, i.e. the lower rated streams are accessed in a constant predetermined order. In the example shown in FIG. 1 the audio stream is always read twice before the subtitle stream is read once, bearing in mind that before and after every audio or subtitle stream access the video stream is read. This can be formally described by n=2 and k=2.

Another important aspect of the invention is the distinction between "one-service-periods" 1SP and "two-services-periods" 2SP. A "one-service-period" 1SP is defined as the time T between two successive peak fillings of the video buffer, wherein the pick-up performs only one service, namely reading video data. Contrary, a "two-services-period" 2SP is defined as the time T between two successive peak fillings of the video buffer, wherein the pick-up performs two services, namely reading video data and reading data from a lower rated stream. Therefore any "two-services-period" 2SP requires the pick-up to jump twice, while any "one-service-period" 1SP requires no pick-up jump, and therefore provides some pick-up idle time, thus giving flexibility, as required below. In general, the inventive schema does not force the video buffer to run empty during these periods, as exemplarily illustrated. E.g. the buffer could also be kept at a certain level until the next service period starts.

The resulting frequency of pick-up jumps, in the following called the "jump-frequency" is for a system with three streams defined as $$f_{jump} := \frac{2}{n \cdot T} + \frac{2}{n \cdot k \cdot T} = \frac{2(k+1)}{n \cdot k \cdot T} \quad \text{(Eq. 1)}$$

It means that two pick-up jumps are required to the medium rated stream within a time of n·T, and two further pick-up jumps to the lowest rated stream within a time of n·k·T. The buffer sizes for all components and the system time constant can be calculated according to the following equations.

A general relation describing the filling or emptying of a buffer of size B is $$t = \frac{B}{R} \quad \text{(Eq. 2)}$$

R is the resulting filling or leakage rate, i.e. filling the buffer with a filling rate R takes a time of t, and emptying the buffer with a leakage rate R also takes the time t. If the empty buffer is filled and emptied simultaneously, with the difference between leakage rate and filling rate being R and the filling rate being higher, it also takes a time of t until the buffer is full.

Thus, the following equations describe the filling and reading processes for three individual components, as shown in FIG. 1:

$$T = t_{fill,V} + t_{leak,V} = \frac{B_V}{R_D - R_V} + \frac{B_V}{R_V} \quad \text{(Eq. 3.1)}$$

$$n \cdot T = t_{fill,A} + t_{leak,A} = \frac{B_A}{R_D - R_A} + \frac{B_A}{R_A} \quad \text{(Eq. 3.2)}$$

$$k \cdot n \cdot T = t_{fill,S} + t_{leak,S} = \frac{B_S}{R_D - R_S} + \frac{B_S}{R_S} \quad \text{(Eq. 3.3)}$$

with n being in the range of $[2, n_{max}]$ and k in the range of $[1, k_{max}]$. Further, the system time constant T obeys to $$T = 2 \cdot T_j + \frac{B_V}{R_D - R_V} + \frac{B_A}{R_D - R_A} \quad \text{(Eq. 4)}$$

This allows calculating the required buffer sizes according to $$B_V = 2 \frac{T_j (R_D - R_V) R_V}{R_D - R_V - n \cdot R_A} \quad \text{(Eq. 5.1)}$$

$$B_A = 2 \frac{n \cdot T_j (R_D - R_A) R_A}{R_D - R_V - n \cdot R_A} \quad \text{(Eq. 5.2)}$$

$$B_S = 2 \frac{n \cdot k \cdot T_j (R_D - R_S) R_S}{R_D - R_V - n \cdot R_A} \quad \text{(Eq. 5.3)}$$

and the system time constant according to $$T = 2 \frac{T_j R_D}{R_D - R_V - n \cdot R_A} \quad \text{(Eq. 5.4)}$$

General assumptions for this scheduler are $$n_{min} = 2 \quad \text{(Eq. 6.1)}$$

$$K_{min} = 1 \quad \text{(Eq. 6.2)}$$

Since the denominator in eq. 5.4 must be positive, this means $$n_{max} = \frac{R_D - R_V}{R_A} \quad \text{(Eq. 6.3)}$$

As a result of the different leakage rates for audio and subtitle buffers follows $$k_{max} = \frac{R_A}{R_S} \quad \text{(Eq. 6.4)}$$

The resulting jump-frequency is $$f_{jump} = \frac{2(k+1)}{n \cdot k \cdot T} = \frac{(k+1)(R_D - n \cdot R_A - R_V)}{n \cdot k \cdot T_j \cdot R_D} \quad \text{(Eq. 7)}$$

To achieve minimal buffering requirements for the scheme, n and k are chosen to their minimal values n=2 and k=1, for the case of three presentation components.

In one embodiment of the invention, preferably the parameter k may be increased (k=1 ... $k_{max}$) in a first step. This results in a reduced pick-up jump frequency with requiring only little additional buffer size. In another embodiment of the invention the second step is to increase also the parameter n (n=1 ... $n_{max}$) to reduce the frequency of pick-up jumps even further.

Figure 2:
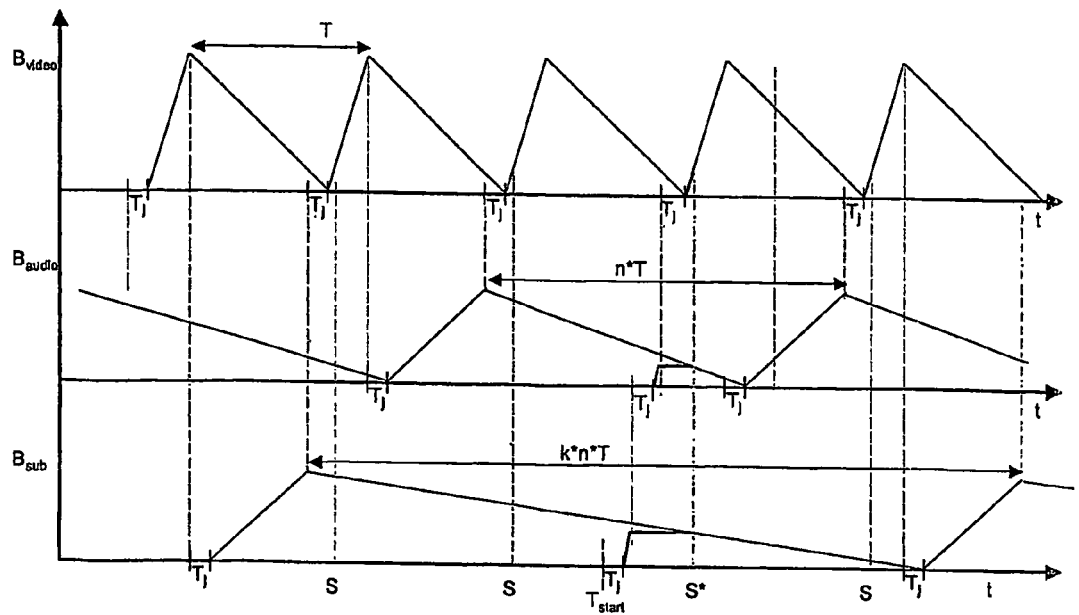
FIG. 2 a diagram showing an optimized start-up procedure.

Advantageously, the invention allows minimizing the start-up delay of a presentation. FIG. 2 shows how this may be achieved by selecting the optimal entry point into the scheduling raster and an appropriate buffer filling sequence. At system start-up $T_{start}$, the video, audio and subtitle data need to be read from the disc and written into the associated buffers $B_{video}$, $B_{audio}$, $B_{sub}$. When this procedure has finished, the presentation can start. According to the invention, the start-up sequence is such that the buffer for the highest rated stream, i.e. video, is filled last, after the buffers for the lower rated streams are already filled. However, different start-up procedures are possible, resulting in different delay times. Possible entry points S,S* into the static scheduling raster are when the filling of each buffer is such that the corresponding decoder can start working. The inventive method of selecting the optimal entry point for minimal start-up delay chooses the possible entry point S* where the required amount of data in the audio and subtitle buffers is the smallest compared to other possible entry points S, so that they require minimal filling time before the presentation starts. The start-up procedure shown in FIG. 2 begins at $T_{start}$ with moving the pick-up to access first the subtitle stream within a time of $T_j$, reading the appropriate amount of subtitle data required at S*, then moving the pick-up to the audio stream and reading audio data as required at S*, and then moving the pick-up to the video stream and reading video data at last. At the time S* the video buffer has enough data to start the video decoder, and thus the presentation. It is assumed here that the buffered amount of audio and subtitle data is sufficient to start their respective decoders, since S* must be selected correspondingly.

It is also possible that e.g. during presentation start-up one or more data streams must be read from the medium that are required only once, e.g. configuration data, and that can be processed at the data rate provided by the pick-up. Therefore, all described procedures refer only to those data streams that are continuously required for the presentation. That means that the described static schedule starts at presentation start-up time S*, and may be flexible before and after the presentation.

In one embodiment of the invention, the process of reading the lower rated streams at start-up is optimized such that the streams are read in the same, or reverse, order that they have on the medium, depending on and starting from the current pick-up position. This minimizes the number of pick-up jumps required during start-up.

Figure 3:
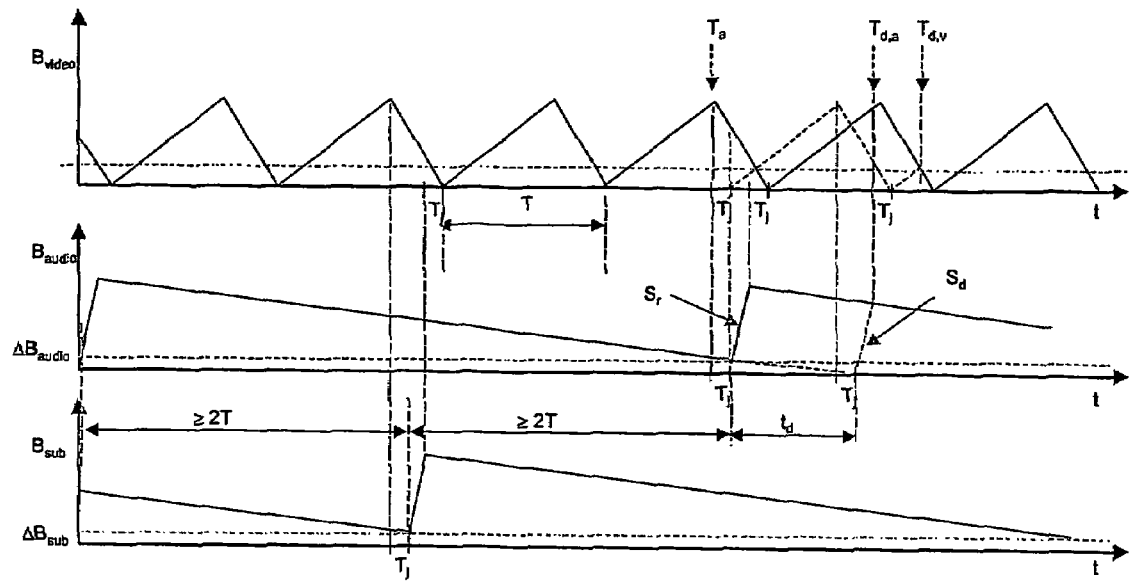
FIG. 3 the principle of delayed services due to a user request.

As another advantage, in one embodiment the inventive method reduces delay times required for seamless angle changes. This can be achieved by delayed servicing, as shown in FIG. 3. The scheduling raster is selected such that the audio buffer $B_{audio}$ and the subtitle buffer $B_{sub}$ have a period of 4·T, i.e. n=4 and k=1. Using the above-mentioned flexibility of the pick-up during one-service-periods, it is possible to handle angle change requests at any time, however assuming that the time between successive requests is more than 2·T, which is not unrealistic. Delayed servicing can be used when in the normal scheduling raster after any two-services-period a one-service-period follows. This means that if the second of any three successively read data streams is the video data stream, then also the first or the third is the video data stream. Advantageously only an actuator movement is required when reading the same stream twice successively, no pick-up movement.

FIG. 3 shows a situation where an angle change is requested at a time $T_a$ when the video buffer has just been filled, and according to the schedule the audio buffer has to be filled next, since it is almost empty. This would be a regular service $S_r$. In order to prevent any interruption of the running presentation in such situation, and simultaneously achieve only minimal angle switch delay, the best solution according to the invention is to serve the angle change request with priority, and serve the audio buffer in a delayed service $S_d$. This means to move the pick-up, when an angle change is requested, within the jump time $T_j$ to the appropriate position on the disc where the requested video stream can be read, flush the video buffer down to the lowest possible angle switch position as described below, and read the new video stream into the video buffer. Then the audio buffer can be served, after another pick-up jump time $T_j$. This requires that the audio buffer can bridge the time period $t_d$ from its regular service $S_r$ start time to the delayed service $S_d$ start time, and thus the audio buffer $B_{audio}$ must be larger than calculated above. Analogously, the same applies for the subtitle buffer $B_{sub}$. The time $t_d$ to be bridged corresponds to the load time of the video buffer, and thus is shorter than T. The additional amount of buffer space $\Delta B_{audio}, \Delta B_{sub}$ can be calculated to $$\Delta B_{audio} = \left(\frac{B_V}{R_D - R_V} + T_j\right) \cdot R_A \quad \text{(Eq. 8.1)}$$

$$\Delta B_{sub} = \left(\frac{B_V}{R_D - R_V} + T_j\right) \cdot R_S \quad \text{(Eq. 8.2)}$$

The additional buffer space, and thus the additional cost, depends directly on the data rate. Therefore this embodiment of the invention comprises an increase of buffer space for the lower rated streams.

To finish the angle switch process according to the invention, the scheduler returns to the original scheduling raster. This may be achieved by interrupting the delayed service $S_d$ for the audio buffer at a time $T_{d,a}$ when the filling of the audio buffer is the same as it would be if a regular service $S_r$ had been performed before. Thus, the audio buffer may return to the original scheduling raster. Then the pick-up may jump to the video stream and fill the video buffer, until at a time $T_{d,v}$ the filling of the video buffer is the same as it would be if no angle change had been requested before. Thus, also the video buffer may return to the original scheduling raster.

Figure 4:
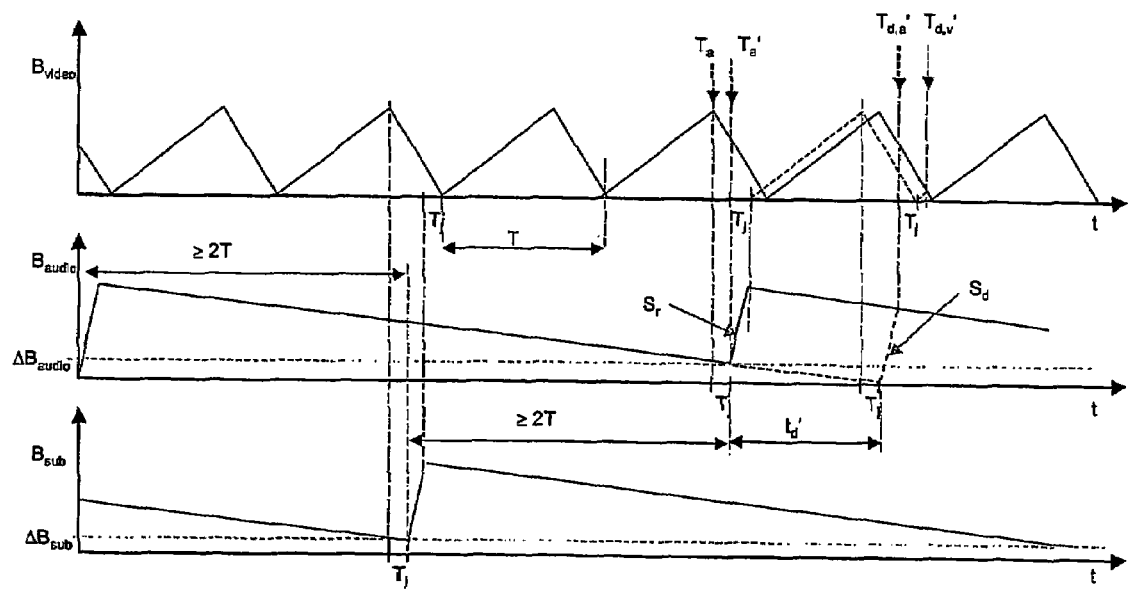
FIG. 4 service interruption by a user request.

In one embodiment of the invention introducing "service interruption" may further reduce angle switch delay, as shown in FIG. 4. This means that in the case of a video angle change request the video buffer is served with priority, even if the pick-up is busy with serving another, e.g. the audio buffer. Thus, the lower prioritized service is interrupted. In FIG. 4 the video buffer is full at a time $T_a$, and the pick-up is moved within the pick-up jump time $T_j$ to the audio stream, which in this example is the next stream in turn. At a nearby time $T_a'$, either during the pick-up jump or during the following regular audio service $S_r$, a video angle change may be requested. According to the invention, the video stream is prioritized such that the pick-up is moved immediately, at $T_a'$, to the new video stream, not completing the audio buffer service. After the pick-up jump time $T_j$ the new video stream is read, and when the video buffer is full, the pick-up returns to the interrupted audio service. After another period of $T_j$ the audio buffer continues to be filled.

As described above for a delayed service $S_d$, the scheduler returns to the original scheduling raster by filling the audio buffer not completely, but only up to the level that it would have if it had been served regularly. When this level is reached at a time $T_{d,a}'$, the pick-up is moved back to the video stream, and the video buffer is flushed down to the lowest possible angle switch position, as described below. Then the pick-up fills the video buffer up to the level that it would have if no angle change had been requested. At that time $T_{d,v}'$ the system has returned to the original scheduling raster, and may continue with it.

The described service interruption requires another additional buffer space for the lower rated stream buffers, because an additional time of 2·$T_j$ must be bridged. Thus, the equations eq. 8.1 and eq. 8.2 become $$\Delta B_{audio} = \left(2 \cdot T_j + \frac{B_V}{R_D - R_V}\right) \cdot R_A \quad \text{(Eq. 9.1)}$$

$$\Delta B_{sub} = \left(2 \cdot T_j + \frac{B_V}{R_D - R_V}\right) \cdot R_S \quad \text{(Eq. 9.2)}$$

The lowest possible angle switch position is used for buffer flushing, as mentioned above. In OOM, video sequences may contain angle switch labels that mark positions, where a seamless angle change is possible. According to one embodiment of the invention, these angle switch labels are stored together with their associated video data. The scheduler may determine the lowest possible angle switch position by selecting the first angle switch label above a certain minimum buffer filling level $B_{v,min}$, also called bonding label. This level $B_{v,min}$ can be calculated as the amount of data that is required to continue video presentation until the new video data arrive at the buffer, roughly after a time of $T_j$ plus a decoding time that is usually negligible. Buffer flushing means that the video data beyond the bonding label are overwritten with the new video data.

Figure 5:
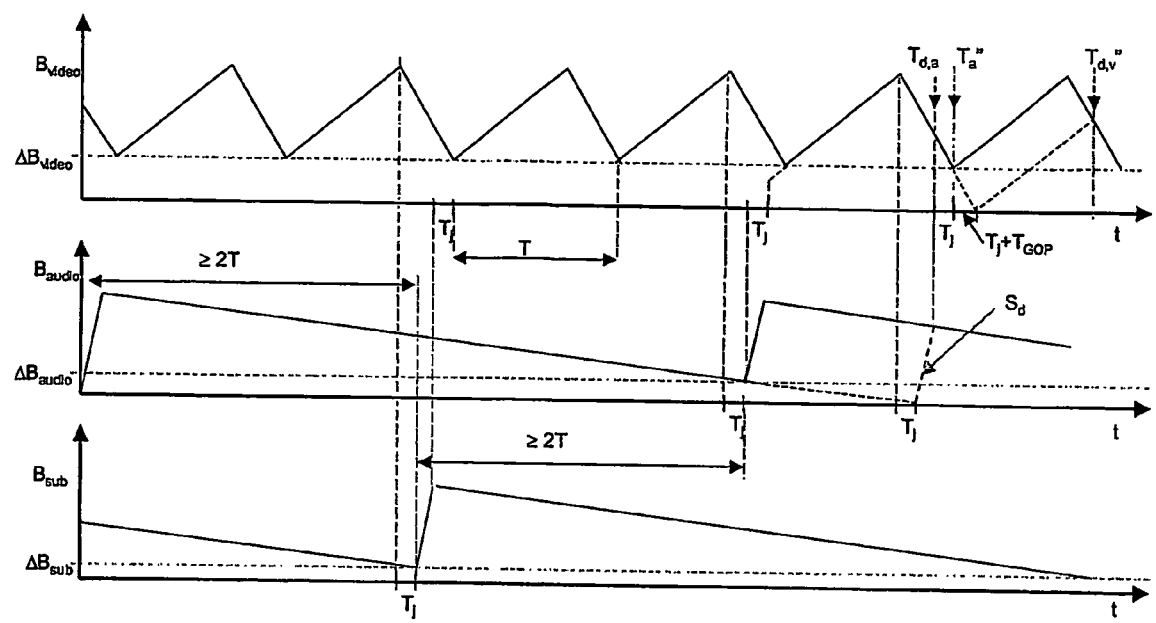
FIG. 5 video service interruption by a user request.

In a further embodiment of the invention the angle switch delay may also be improved for the case that an angle switch is requested while the video buffer is being served, as shown in FIG. 5. Advantageously, this leads to a shorter recovery time between two successive angle change requests, or to a recovery time that is less dependent on the video contents. Since the delay time between the request for an angle change and its presentation depends on the remaining video buffer filling up to the bonding label, and therefore depends also on the current video data rate, it may be unacceptably high for low video data rates. FIG. 5 shows a delayed service $S_d$ for audio data, as described above, and the pick-up returning to the video data stream at a time $T_{d,a}$, taking a jump time of $T_j$. At a time $T_a''$, which is later than $T_{d,a}$ and could be e.g. within $T_{d,a}+T_j$ or while the video buffer is being filled, a video angle change may be requested. As a worst case, FIG. 5 shows $T_a''$ being equal to $T_{d,a}+T_j$. To handle this situation, in this embodiment of the 30 invention also a delayed service for video is possible, meaning that the scheduler interrupts the pick-up reading the current video stream and moves it to another video stream that contains the video data for the requested angle. It may take an additional delay time of $T_j+T_{GOP}$ to have the video visible, where $T_{GOP}$ is the duration of a video access unit that is sufficient for decoding. In the case of e.g. an MPEG video stream, this is a group-of-pictures (GOP). Generally $T_{GOP}$ is the minimal amount of a certain type of data used for decoding. $T_{GOP}$ was neglected in the previous examples since for audio and subtitles it is considerably less than $T_j$. It could be added without changing the achieved results by replacing $T_j$ with "$T_j+T_{GOP}$" where $T_{GOP}$ refers to the audio or subtitle decoder. To support delayed service, the video buffer must bridge the additional delay time $T_t+T_{GOP}$, wherein it is sufficient to assume $T_j+T_{GOP}$ always being less than T. The video buffer is therefore enlarged by the minimum amount of $$\Delta B_V = R_V(T_j+T_{GOP}) \tag{Eq. 10}$$

Generally it is assumed that any buffer mentioned in this disclosure may be replaced by a plurality of cooperating buffers. Further, it is possible that buffers for different data streams may be implemented in a single device.

Advantageously, the invention can be used for devices that construct multi-media or audio-visual (AV) representations from data read from a storage medium, e.g. an optical storage medium such as a DVD or Blu-ray disc, wherein a single pick-up reads multiple data streams.

More generally, the invention can be used for devices that construct any combined data representation from a plurality of data streams that are read from a single storage medium, e.g. optical storage medium, wherein the data streams are read by a single pick-up and the data streams have different data rates.

The invention claimed is:

1. A method for controlling a pick-up for reading three or more out-of-multiplex data streams from a storage medium, the data streams being used for simultaneous reproduction and belonging to different data types with different constant or variable data rates, and the data streams being distributed to more than one file on said storage medium and being separately buffered after reading, wherein the pick-up data rate is higher than any of the buffer output data rates, with the amount of buffered data relating to any of said data streams being at least such that subsequent processing can be provided with the buffered data during the time required for accessing and reading the other data streams of the other data types, the method comprising:

buffering a first data stream of a first data type, the data stream having the highest buffer output data rate of all said three or more buffered data streams, wherein said first data stream is read and buffered periodically in periods of a first period time; and accessing the data streams by the pick-up according to a predefined temporal scheme, the scheme being such that, after an Initialization, for any three successive data stream accesses, wherein the second access reads another than said first data stream, the first and last accesses read said first data stream, and wherein the data streams other than said first data stream are accessed and buffered in a constant predetermined order in periods of integer multiples of said first period time, the integer being two or more.

2. Method according to claim 1, wherein the pick-up is an optical pick-up and the data streams comprise a video data stream, an audio data stream and a subtitle data stream.

3. Method according to claim 1, wherein said periods for reading the other buffers are individual for each buffer, such that the period for reading of a data stream from the storage medium is the shorter, the higher the buffer output data rate of the data stream is.

4. Method according to claim 1, wherein the periods relating to accessing and buffering the other data streams than said first data stream are integer multiples of each other.

5. Method according to claim 4, wherein the period relating to accessing and buffering one of the other data streams is at least twice the period relating to accessing and buffering another of said other data streams.

6. Method according to claim 1, wherein an interrupt request may interrupt the scheme, and after serving the interrupt request the same scheme as before is continued, wherein said continuing of the same scheme is achieved by loading one or more buffers only partially, to the level the buffer or buffers would have in the scheme at that time if the scheme had been continued without interruption.

7. Method according to claim 1, wherein the start-up procedure comprises buffering an individual initial amount of data from each data stream, wherein the initial amount of buffered data is sufficient for each of the respective decoders to start working, and wherein the initial amount of buffered data corresponds to a position within the scheme where the amount of buffered data of the lower rated streams is minimal.

8. Method according to claim 1, wherein additional data from other streams than said first data stream are buffered, the additionally buffered data leading to an additional time during which these additional data are output from the buffer, the additional buffer output time being shorter than said period.

9. Method according to claim 1, wherein additional video data from said first data stream is buffered, the additionally buffered data leading to an additional time during which these additional data are output from the buffer, the additional time, represented by $(T_j+T_{GOP})$, being shorter than said period, wherein $T_j$ corresponds to the period when the scheduler interrupts the pick-up reading of a current video stream and moves to another stream that contains the video data for a requested angle, and $T_{GOP}$ corresponds to a duration of a data unit that is sufficient for decoding.

10. Apparatus for reading three or more out-of-multiplex data streams for simultaneous reproduction from a storage medium, the data streams belonging to different data types with different constant or variable data rates, and the data streams being distributed to more than one file on said storage medium and being separately buffered after reading, wherein the pick-up data rate is higher than any of the buffer output data rates, with the amount of buffered data relating to any of said data streams being at least such that subsequent processing can be provided with the buffered data during the time required for accessing and reading the other data streams of the other data types, the apparatus comprising:

means for buffering a first data stream of a first data type, the data stream having the highest buffer output data rate of all said buffered data streams, wherein said first data stream is read and buffered periodically in periods of a first period time; and means for controlling a pick-up for reading the data streams, wherein the pick-up accesses the data streams according to a predefined temporal scheme, the scheme being such that, after an initialization, for any three successively read data streams, wherein the second access reads another than said first data stream, the first and last accesses read said first data stream, and wherein the data streams other than said first data stream are accessed arid buffered in a constant predetermined order in periods of integer multiples of said first period time, the integer being two or more.

11. Apparatus according to claim 10, wherein the periods relating to accessing and buffering the other data streams than said first data stream are integer multiples of each other.

12. Apparatus according to claim 11, wherein the period relating to accessing and buffering one of the other data streams is at least twice the period relating to accessing and buffering another of said other data streams.

13. Apparatus according to claim 10, wherein additional data from other streams than said first data stream are buffered, the additionally buffered data leading to an additional time during which these additional data are output from the buffer, the additional buffer output time being shorter than said period.

14. Apparatus according to claim 10, wherein additional video data from said first data stream is buffered, the additionally buffered data leading to an additional time $T_j+T_{GOP}$ during which these additional data are output from the buffer, the additional time being shorter than said period, wherein $T_j$ corresponds to the period when the scheduler interrupts the pick-up reading of a current video stream and moves to another stream that contains the video data for a requested angle, and $T_{GOP}$ corresponds to a duration of a data unit that is sufficient for decoding.

* * * * *

UNITED STATES PATENT AND TRADEMARK OFFICE
CERTIFICATE OF CORRECTION

PATENT NO. : 7,643,384 B2  Page 1 of 1
APPLICATION NO. : 10/552264
DATED : January 5, 2010
INVENTOR(S) : Hörentrup et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 830 days.

Signed and Sealed this

Sixteenth Day of November, 2010

David J. Kappos
*Director of the United States Patent and Trademark Office*